United States Patent
Kirchdoerffer et al.

(10) Patent No.: US 6,319,448 B1
(45) Date of Patent: Nov. 20, 2001

(54) PROCESS FOR THE PRODUCTION OF AN APPARATUS OR INSTRUMENT BY OVERMOLDING AND APPARATUS OR INSTRUMENT THUS OBTAINED

(76) Inventors: Remy Kirchdoerffer, 32 rue de General Koenig, 67110 Reichshoffen; Pierre Elefteriou, 17 rue des Cigognes, 67350 Pfaffenhoffen, both of (FR)

(*) Notice: Subject to any disclaimer, the term of this patent is extended or adjusted under 35 U.S.C. 154(b) by 0 days.

(21) Appl. No.: 09/313,739

(22) Filed: May 18, 1999

(30) Foreign Application Priority Data

May 18, 1998 (FR) .................................................. 98 06435

(51) Int. Cl.$^7$ ........................... B29C 45/14; B29C 70/70; B29C 33/12
(52) U.S. Cl. .................... 264/263; 264/272.15; 264/277; 264/272.17
(58) Field of Search ..................................... 264/254, 263, 264/271.1, 272.11, 272.14, 272.15, 272.17, 275, 277; 29/592.1, 833, 834, 841

(56) References Cited

U.S. PATENT DOCUMENTS

| | | | |
|---|---|---|---|
| 3,981,074 | * 9/1976 | Yamamoto et al. | 29/588 |
| 4,701,999 | * 10/1987 | Palmer | 264/272.17 |
| 4,766,095 | 8/1988 | Hiroshi . | |
| 4,823,234 | * 4/1989 | Konishi et al. | 361/386 |
| 5,192,682 | * 3/1993 | Kodai et al. | 437/219 |
| 5,357,673 | * 10/1994 | Polak et al. | 29/840 |
| 5,444,025 | * 8/1995 | Sono et al. | 257/796 |
| 5,458,716 | * 10/1995 | Alfaro et al. | 156/245 |
| 5,468,910 | * 11/1995 | Knapp et al. | 264/272.17 |
| 5,498,388 | * 3/1996 | Kodai et al. | 264/263 |
| 5,692,296 | * 12/1997 | Variot | 29/841 |
| 5,849,230 | * 12/1998 | Murohara | 264/272.15 |
| 5,935,502 | * 8/1999 | Ferri et al. | 264/272.15 |

FOREIGN PATENT DOCUMENTS

| | | |
|---|---|---|
| 0 171 769 | 2/1986 | (EP) . |
| 59-155732 | 9/1984 | (JP) . |
| 61-124832 | 6/1986 | (JP) . |
| 63-226033 | 9/1988 | (JP) . |
| 09-015060 | 1/1997 | (JP) . |

* cited by examiner

*Primary Examiner*—Angela Ortiz
(74) *Attorney, Agent, or Firm*—Young & Thompson

(57) ABSTRACT

A process for the production of measuring apparatus or instrument by total or partial overmolding of its functional elements, particularly of its components and electric and electronic circuits. The process consists in arranging a support structure (2) carrying the functional elements (3, 3') and being adapted to be present particularly in the form of one or several cards or plates, in an injection mold (4), the support structure (2) being positioned in the mold (4) particularly by at least one element (5) in the form of a cap or shell on the support structure (2) and of which at least one wall portion (5') rests directly against the internal surface (4') of the mold (4), then injecting, after closing the mold (4), the thermoplastic material adapted to form the body (6) or at least a portion of the body (6) of the apparatus or the instrument (1) in question and covering entirely or partially the element or elements (5) in the form of a cap or shell, except the wall or wall portions (5') in contact with the internal surface (4') of the mold (4) and, finally, after solidification of the thermoplastic material, removing the apparatus or instrument (1) from the mold (4).

7 Claims, 3 Drawing Sheets

PROCESS FOR THE PRODUCTION OF AN APPARATUS OR INSTRUMENT BY OVERMOLDING AND APPARATUS OR INSTRUMENT THUS OBTAINED

FIELD OF THE INVENTION

The present invention relates to the field of the production of apparatus and instruments, more particularly those subjected to extreme conditions of use and/or cleaning, and has for its object a process for the production of an apparatus or instrument, as well as an apparatus or instrument, particularly of the electronic thermometer type, obtained by this process.

BACKGROUND OF THE INVENTION

Certain apparatus or instruments enclosing electrical and/or electronic components can be used under conditions of shock, exposure to liquids, disinfection and strong chemical and physical aggression.

Such is particularly the case with electronic thermometers, particularly those used in a hospital environment.

However, these instruments are at present produced by assembly, for example by screwing, welding or snapping in, of two half shells or by assembly of a single shell body with a cap, the printed card or circuit supporting functional elements being first introduced into the body of these instruments.

As a result, there are joint lines and surface discontinuities, which constitute regions of weakness in terms of sealing, which can give rise to damage to the instrument, particularly when it is immersed for a prolonged period into a liquid, for example a disinfectant. Such instrument requires a long cleaning and disinfection time, which is troublesome for personnel in charge of this operation and for this reason often shortened.

There are known moreover techniques of production of pieces or elements by overmolding by injection of thermoplastic material, permitting creating pieces and elements resistant to shocks, compact and relatively sealed, without requiring recourse to fastidious and economically undesirable assembly processes.

However, the present overmolding techniques use wedging elements opening on the external surface of the overmolded piece and constitute discontinuities at this point, not permitting the overmolding of pieces sensitive to heat, or pressure, nor permitting a passage extending from the element to be overmolded to the external surface of the overmolded product. These techniques give rise to a large consumption of thermoplastic material, increasing the cost of production and the weight of the finished product.

SUMMARY OF THE INVENTION

The present invention has particularly for its object to overcome at least certain of the mentioned drawbacks.

To this end, the present invention has for its object a process for the production of a measuring apparatus or instrument by total or partial overmolding of its functional and/or constituent elements, particularly of its components and electrical or electronic circuits, which comprises positioning the support structure carrying said functional elements and which can be present particularly in the form of one or several cards or plates, in an injection mold, said support structure being positioned in the mold particularly by means of at least one element in the form of a cap or shell provided on said support structure and of which a portion of the wall at least rests directly against the internal surface of said mold, then in injecting, after closing the mold, the thermoplastic material adapted to form the body or at least a part of the body of the apparatus or of the instrument in question and covering entirely or partially the element or elements in the form of a cap or shell, except the wall or walls or portions thereof in contact with the internal surface of the mold of this latter and, finally, after solidification of the thermoplastic material, extracting said apparatus or instrument from said mold.

The invention also has for its object an electronic thermometer comprising a card or printed circuit supporting the functional elements and connected to a module for detecting temperature terminating in a probe, obtained by the preceding process.

The invention will be better understood from the following description, which relates to a preferred embodiment, given by way of non-limiting example, and explained with reference to the accompanying schematic drawings, in which:

DETAILED DESCRIPTION OF THE INVENTION

Figure 1:
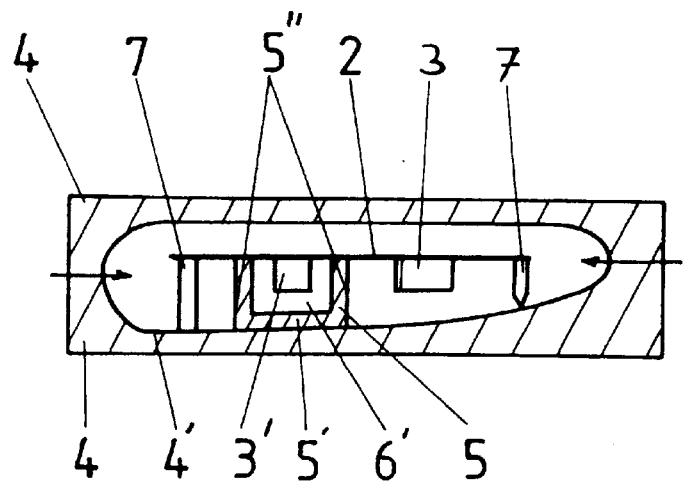
FIG. 1 is a side elevational view in cross section of a support structure of functional elements disposed in an injection mold, before overmolding.
Figure 2:
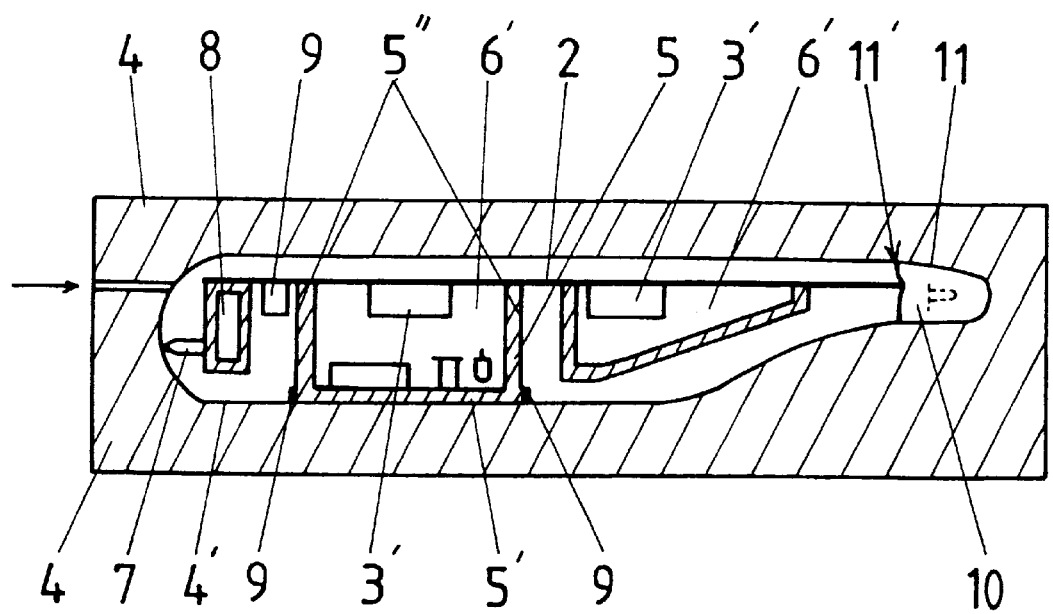
FIG. 2 is a side elevational and cross-sectional view of an assembly of a temperature detector/printed circuit module of an electronic thermometer disposed in an injection mold, before overmolding.
Figure 4:
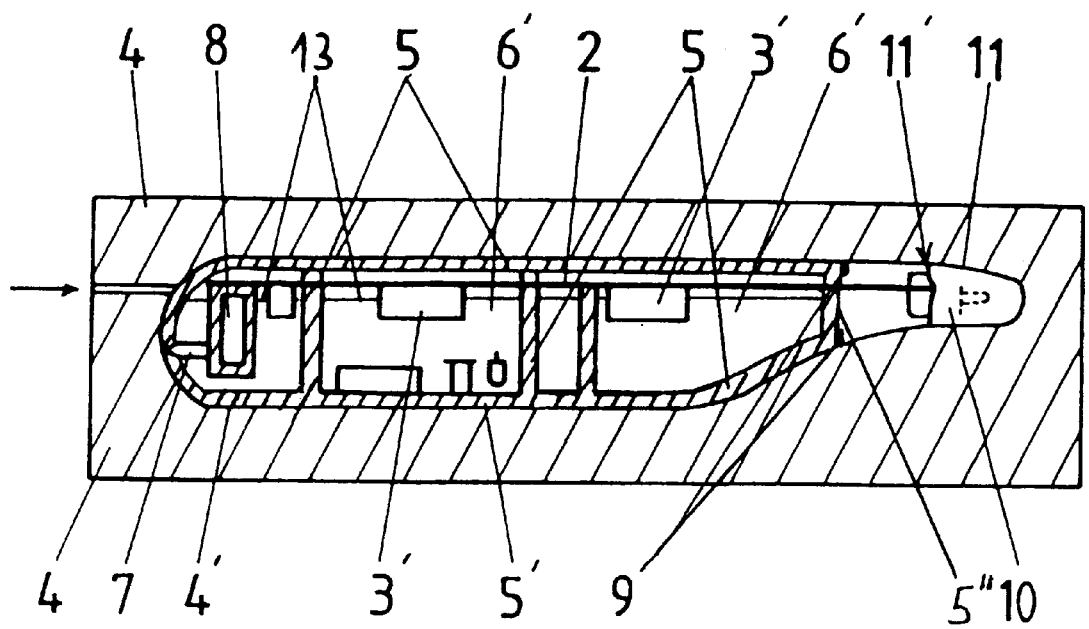
FIG. 4 is a view similar to that of FIG. 2 according to a modified embodiment of the invention.

As shown in FIGS. 1, 2 and 4 of the accompanying drawings, the process for production according to the invention consists essentially in positioning the support structure 2 carrying said functional elements 3, 3' which can particularly be in the form of one or several cards or plates, in an injection mold 4. The support structure 2 is positioned in the mold 4 particularly by means of at least one element 5 in the form of a cap or shell on said support structure 2 and whose one wall portion 5' at least rests directly against the internal surface 4' of said mold 4. Then, after closing the mold 4, one injects the thermoplastic material adapted to form the body 6 or at least a portion of the body 6 of the apparatus or instrument 1 in question. One then covers entirely or partially the element or elements 5 in the form of a cap or a shell, except the wall or walls or portions of walls 5' in contact with the internal surface 4' of the mold 4 of these latter. Finally, solidifying the thermoplastic material solidifies, and the apparatus or instrument 1 is extracted from said mold 4.

The element 5 can accordingly, in certain cases, all by itself ensure maintenance of the support structure 2 in the mold 4 and will thus form the only overmolded element opening on the external surface of the apparatus or of the instrument 1.

The wall or wall portion 5' could perform several functions, if desired cumulative, both technical and aesthetic.

Thus, the wall or wall portion 5' of the cap or shell 5 in contact with the internal surface 4' of the mold 4 could be transparent over at least a portion of its surface and/or have a flexible texture over at least a portion of its surface.

The mentioned arrangements permit arranging under said wall or wall portion 5' signal indicators or display means, for example of the LED or LCD type, as well as control means of the button type or the like, permitting effecting an interactive connection between the user and the instrument or apparatus 1, without compromising the sealing of this latter.

Moreover, by forming hollow cavities, said at least one element 5 in the form of a cap or shell permits reducing the quantity of thermoplastic material necessary for overmolding.

Still further, so as to avoid any damage to the functional elements 3, 3' in the course of overmolding, given the temperatures of condition, pressure and speed of injection connected to this operation, said at least one element 5 provided in the form of a cap or shell constitutes with the corresponding card or plate 2 a substantially closed structure, insulating the circuit or circuits or sensitive components 3', particularly those sensitive to heat, from the hot injected thermoplastic material.

When supplemental support of the card or plate 2 in the mold 4 is required, this latter may also comprise at least one wedge member 7 adapted to rest against the internal surface 4' of the closed mold 4 by means of a point contact or quasi-point contact, or not, after it is provided that the end of said wedge member 7 be visible or not (see particularly FIG. 1 of the accompanying drawings).

Figure 3:
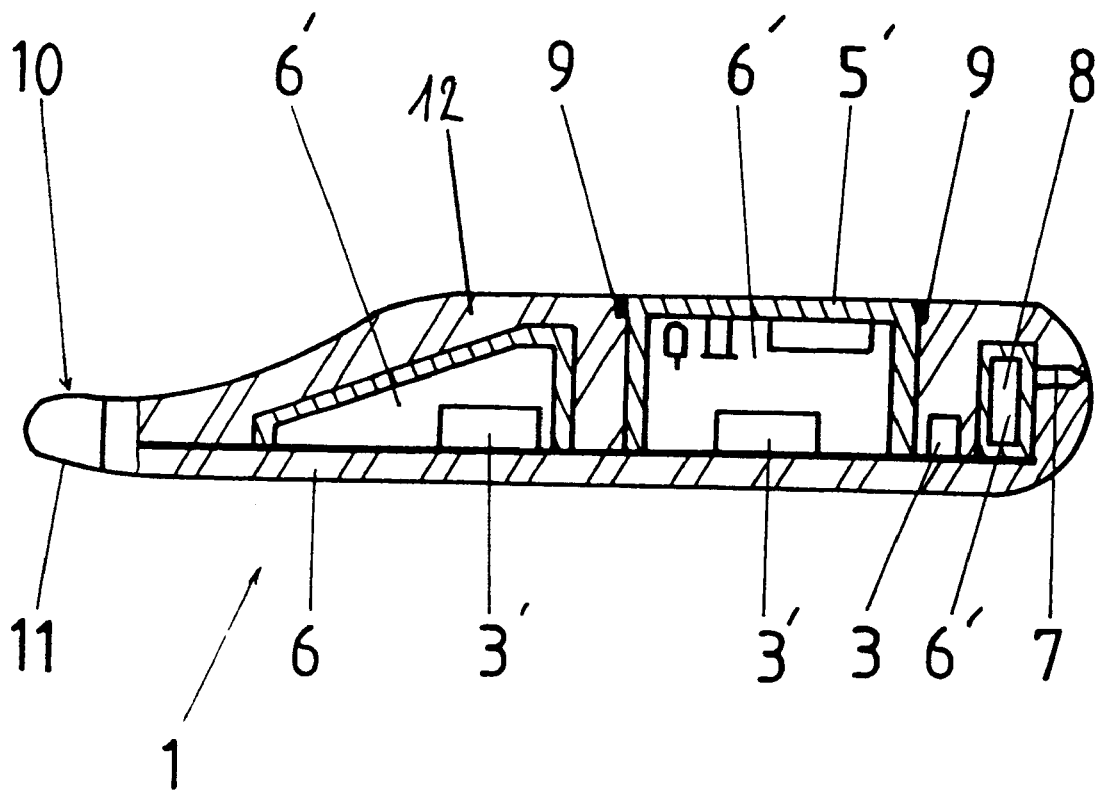
FIG. 3 is a side elevational and cross-sectional view of an electronic thermometer according to a first embodiment of the invention.

According to a first modification of the invention, shown in FIGS. 1 to 3 of the accompanying drawings, the injected thermoplastic material 12 forms substantially all of the body 6 of monobloc construction of the apparatus or instrument 1 and covers entirely the support structure 2, the functional elements 3 and the element or elements 5 in the form of a cap or shell, except the wall or walls or wall portions 5' in contact with the internal surface 4' of the mold 4 of these latter.

So as to lighten the instrument or apparatus in question, and to be able to define a substantially constant cladding or overmolding layer, even in the case of an external shape of a greatly variable cross section, and to be able to balance the distribution of the mass of said apparatus or instrument 1, the process can consist in giving to the card or cards 2 several elements 5, 8 constituting hollow closed structures or forming with the card 2 hollow closed structures, of which at least one is in contact with the internal surface 4' of the mold 4 and/or of which at least one covers at least one sensitive circuit or component 3' by insulating it from any contact with the injected thermoplastic material, adapted to form the body 6.

Figure 5:
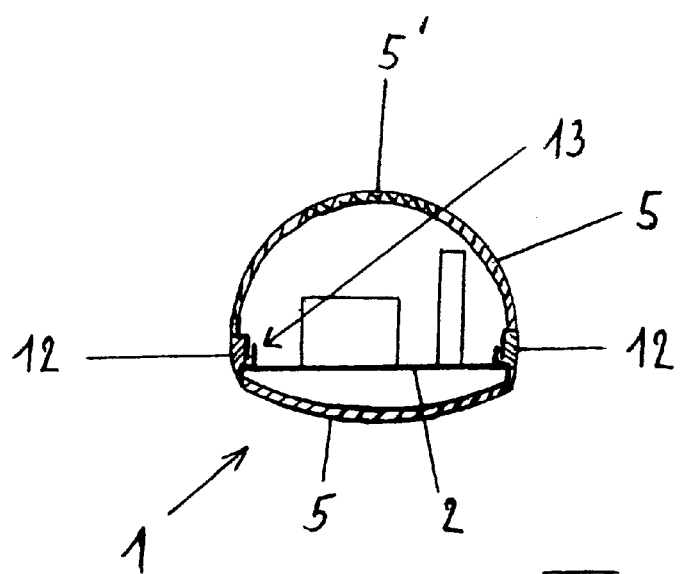
FIG. 5 is a transverse cross-sectional view of an electronic thermometer obtained by means of the practice of the invention.

According to a second modification of the invention, shown in FIGS. 4 and 5 of the accompanying drawings, the element 5 in the form of a hollow shell can enclose substantially all the support structure 2 and delimit substantially the volume and the external shape of the body 6, the over-molded thermoplastic material 12 covering only the regions of joining and assembly of said shell.

This latter could, as shown in FIG. 5 of the accompanying drawings, be formed of two half shells (upper and lower parts) assembled together at the level of a circumferential assembly line 13 by means of a snap-in or zigzag connection.

Preferably, the element 5 in the form of a shell has, at the level of its regions of joining and assembly, particularly at the level of the assembly lines 13 of these different constituent portions, a configuration that is reinforced or depressed relative to the external shape of the body 6 as defined by the mold 4, permitting obtaining perfect sealing and mechanical strength because of the thickness of the resulting overmolded material.

So as to ensure total sealing between the element 5 or the elements 5 and the thermoplastic material forming the body 6 nearest the external surface 6' of the apparatus or instrument 1, each element 5 in the form of a cap or shell can have at the level of its side walls 5", for example, in the first modification, adjacent its wall or its wall portion 5' in contact with the internal surface 4, of the mold 4, at least one non-planar peripheral surface strip 9, comprising for example configurations in the form of ribs and grooves, forming sealing zigzag structure.

Although the process of production can be used for the manufacture of various apparatus or instruments 1, it is particularly well adapted for the production of instruments or apparatus for measurement, particularly electronic thermometers or devices for similar measurements.

Such an electronic thermometer will comprise a card 2 supporting the electrical and electronic components 3, 3' and a temperature detection module 10, connected to said card 2 and integrating a corresponding probe. This module 10 is encapsulated, first by overmolding the body 6 of the thermometer 1, in a shell 11 of suitable material, only a rear portion 11' of said shell 11, directed toward the card 2, being overmolded by the thermoplastic material forming the body 6.

The temperature detecting module 10 could preferably be mounted on or connected to the card or plate 2 by rigid connection and thereby serve as a holding and wedging member of said card or plate 2 in the mold 4, its portion uncovered by the thermoplastic material being adapted to rest directly against the internal surface of said mold 4 and to be if desired pinched between the constituent portions of this latter or rest on the lower portion of the element 5 of shell shape.

The present invention also has for its object an electrical or electronic apparatus or instrument having a body resulting from partial or total overmolding of its functional elements obtained by means of the process for production described above.

Finally, the invention relates, moreover, as shown in FIG. 3 of the accompanying drawings, to an electronic thermometer 1 comprising a card or printed circuit 2 supporting its functional elements 3, 3' and connected to a temperature detecting module 10 integrating at least one probe. The body 6 of the thermometer 1 is formed by overmolding a thermoplastic material of a bio-compatible nature. The body 6 comprises at least one hollow cavity 6' each delimited, on the one hand, by the card or the printed circuit 2 and, on the other hand, by an element 5 in the form of a cap or shell disposed on said card or said printed circuit 2 and of which at least one wall portion 5' is not covered by the thermoplastic material and is flush with the external surface 6" of said body 6.

The wall or wall portion 5' flush and uncovered by the thermoplastic material forming the body 6 is at least partially flexible and/or at least partially transparent. The element 5 in the form of a cap or shell extends from above at least one component or circuit 3' sensitive particularly to heat and/or at least one component or circuit of luminous or sonar signaling, such as indicators, a display screen, a vibrator, a beeper or the like.

As a modification, and as shown in FIG. 5 of the accompanying drawings, the body 6 of said thermometer 1 is essentially constituted by an element 5 in the form of a hollow shell, overmolded at the level of the lines of assembly of its constituent portions and of its joint zones with the detector module 10 with a thermoplastic material 12. These regions or lines are as the case may be located set back relative to the external surface or body 6 or to the bottom of a groove. The thermoplastic material 12 covers these zones or lines in a manner to constitute an external surface contiguous with the external surface of the adjacent portions of the element 5 in the form of a shell.

According to one characteristic of the invention, shown in FIG. 3 of the accompanying drawings, the temperature detecting module 10 is encapsulated in a shell 11 of a suitable material of which only one rear end portion 11' is covered by the thermoplastic material of overmolding.

The rear end portion 11' could also comprise configurations of grooves and ribs, adapted to permit a solid and sealed connection by imbrication between the overmolded body 6 and the shell 11 covering and enclosing the module 10, the thermoplastic material being preferably able to form a joint with an external lip.

The shell 11 could itself be of the overmolded type and made of a material which is a good conductor of heat.

As already indicated above, the overmolded body 6 could preferably comprise several hollow cavities 6' delimited by hollow closed elements 8 and/or in the form of a shell or cap 5 provided on the card or printed circuit 2, of which at least one is flush at the level of its external surface 6" with the body 6 and/or encapsulates at least one sensitive component 3'.

Preferably, the electronic thermometer 1 described above is obtained by means of the process of production described above, as well as the finished product made by molding and having a rounded outer shape, substantially without reinforcement and without crevices.

Of course, the invention is not limited to the embodiments described and shown in the accompanying drawings. Modifications remain possible, particularly as to the construction of the various elements or by substitution of technical equivalents, without thereby departing from the scope of protection of the invention.

What is claimed is:

1. Process for the production of an electronic thermometer by total or partial overmolding of its functional constituent elements, and its electronic circuit components, which comprises:

enclosing a card and the circuit components in an element in the form of a hollow cap (5) comprised of an upper part and a lower part assembled together by a zigzag connection, and substantially delimiting the volume and external shape of the thermometer;

encapsulating a temperature detection module in a shell (11);

placing said card bearing said circuit components, and the temperature detection module in an injection mold (4), said card being positioned in the mold by at least one wedge member (7) resting against an internal surface (4') of the mold closed by a contact point, and by at least one wall portion (5') of said element resting directly against the internal surface of the mold;

then, after closing said mold, injecting a thermoplastic material (12) adapted to form the thermometer, and substantially covering the element in the form of a cap, except the wall portion (5') in contact with the internal surface (4') of the mold and a rear end portion (11') of the shell (11) encapsulating said temperature detection module; and after solidification of the thermoplastic material, removing said thermometer from said mold.

2. The process according to claim 1, wherein the wall portion of the cap in contact with the internal surface of the mold is transparent over at least a portion of its surface.

3. The process according to claim 1, wherein the wall portion of the cap in contact with the internal surface is flexible over at least a portion of its surface.

4. The process according to claim 1, wherein the injected thermoplastic material forms substantially all the body of the thermometer in a single piece, and covers entirely the card, the functional constituent elements, and the element in the form of a cap, except the wall portion in contact with the internal surface of the mold.

5. The process according to claim 1, wherein the element in the form of a cap has, at the level of its regions of assembly, a reinforced configuration or a configuration in depression relative to the external shape of the thermometer as defined by the mold.

6. The process according to claim 1, wherein the element in the form of a cap has at the level of its side walls, at least one strip of a non-planar peripheral surface comprising configurations in the form of ribs and grooves.

7. The process according to claim 1, wherein the temperature detection module is connected to said card and includes a corresponding probe.

* * * * *